United States Patent [19]
O'Brien et al.

[11] 3,848,421
[45] Nov. 19, 1974

[54] RISER SECTION APPARATUS

[76] Inventors: Billy L. O'Brien, 1400 Pine St.;
Heber P. O'Brien, 730 E. 14th St.,
both of Ada, Okla. 74820

[22] Filed: Dec. 6, 1972

[21] Appl. No.: 312,572

Related U.S. Application Data
[63] Continuation-in-part of Ser. No. 121,788, March 8, 1971.

[52] U.S. Cl............... 61/72.3, 285/18, 285/24, 285/332, 285/363, 285/405
[51] Int. Cl............ F16l 35/00, B23q 1/08
[58] Field of Search............ 61/72.3, 72.1; 285/332, 285/405, 363, 296, 399, 18, 286, 24

[56] References Cited
UNITED STATES PATENTS

| | | | |
|---|---|---|---|
| 2,034,808 | 3/1936 | Graham | 285/399 X |
| 2,037,962 | 4/1936 | Brown | 285/399 X |
| 3,301,576 | 1/1967 | Vigneron | 285/332 |
| 3,615,107 | 10/1971 | Paddington | 285/18 |

Primary Examiner—Jacob Shapiro
Attorney, Agent, or Firm—Dunlap, Laney, Hessin, Dougherty & Codding

[57] ABSTRACT

An improved riser section apparatus wherein the riser sections are interconnected to form an underwater riser, each riser section having a support ring engageable with a riser support assembly for securely supporting the riser sections during the interconnections thereof. In one aspect, the riser sections have connecting upper and lower ends shaped to facilitate the secure interconnection of the riser sections, and an alignment assembly is utilized, in one form, to facilitate the bolting interconnection between riser sections.

8 Claims, 10 Drawing Figures

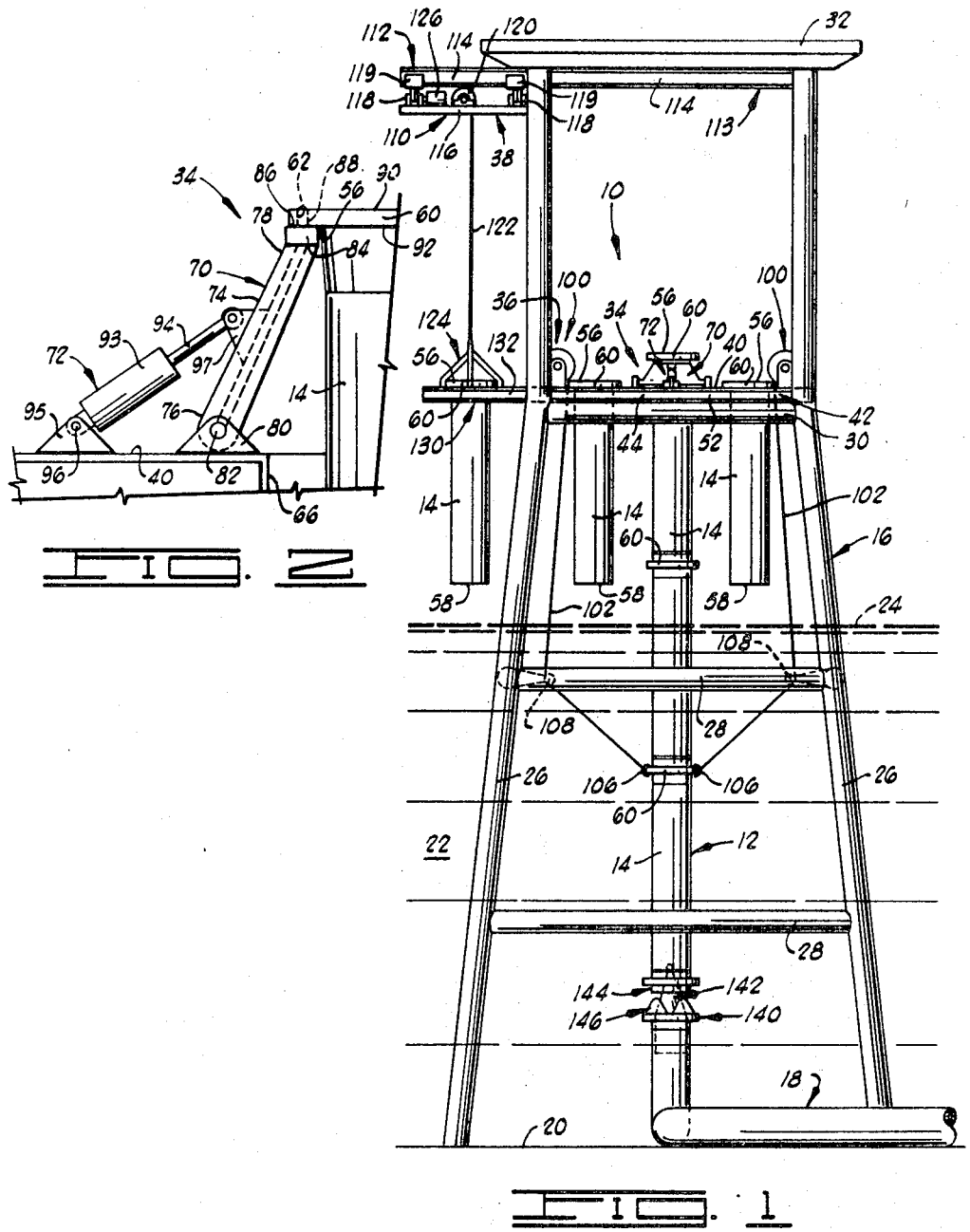

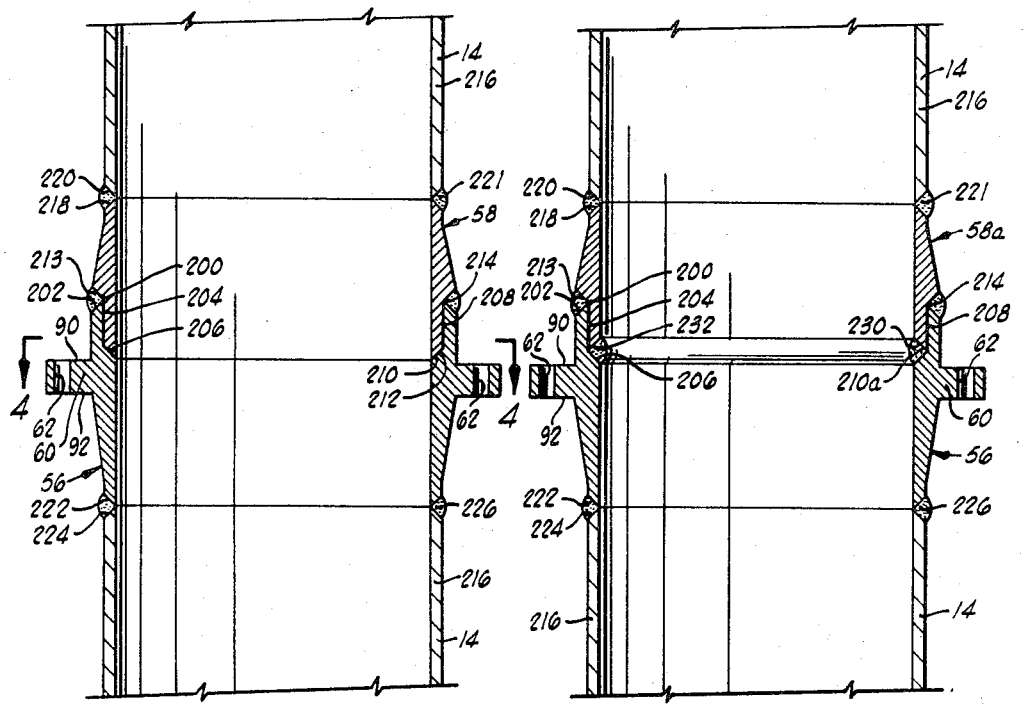
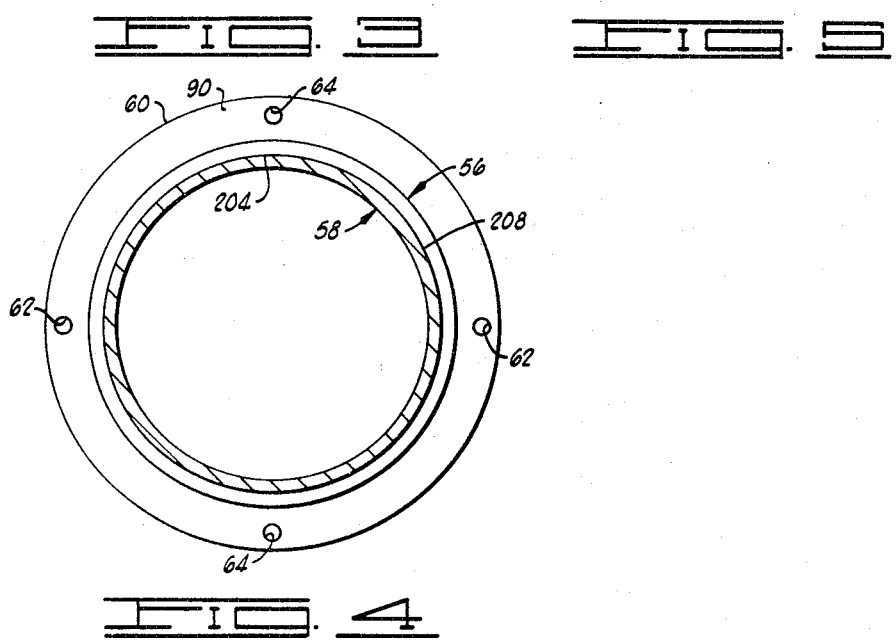

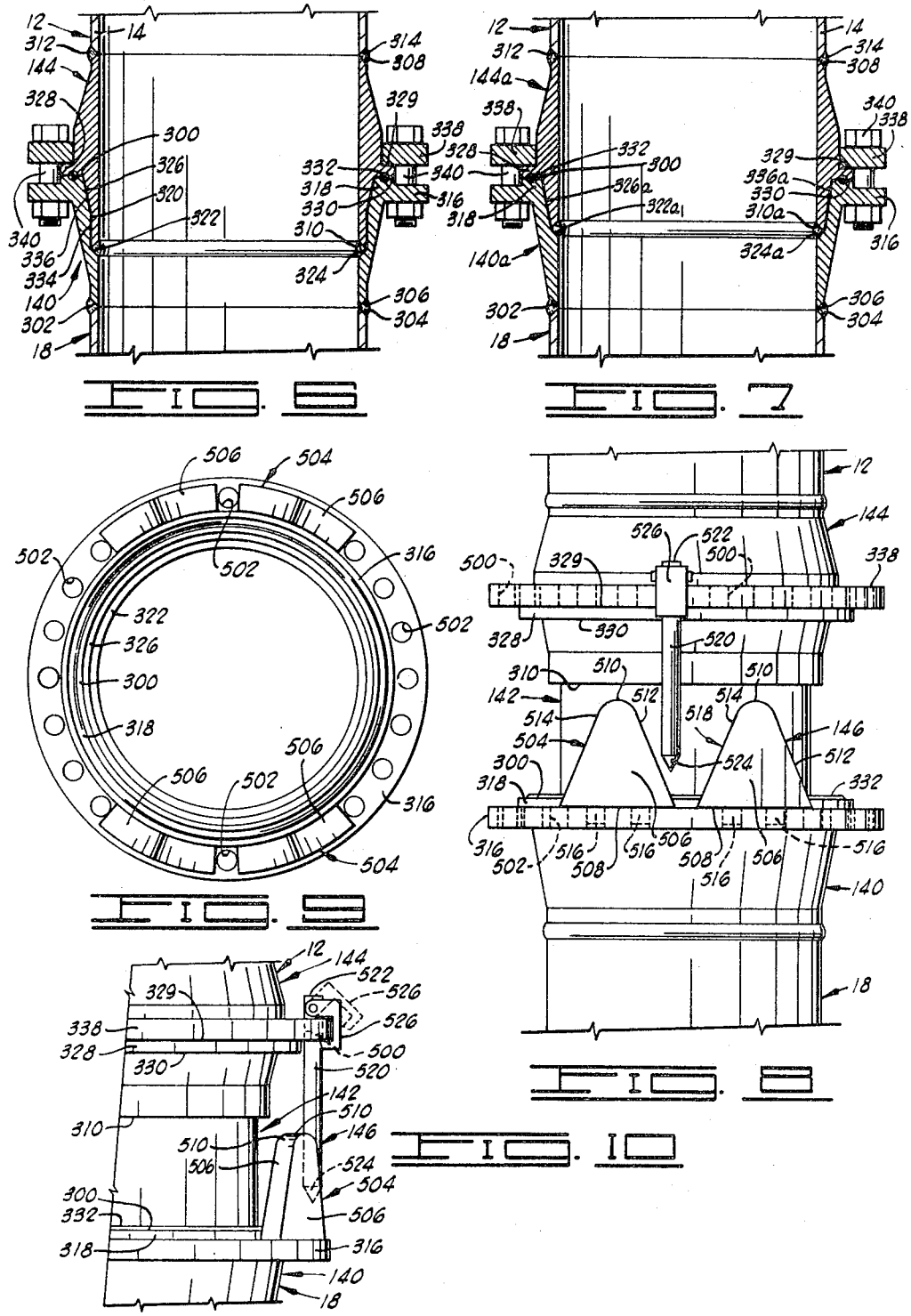

RISER SECTION APPARATUS

REFERENCE TO RELATED APPLICATIONS

This application is a continuation-in-part of the Applicants' co-pending application entitled "METHOD AND APPARATUS FOR CONSTRUCTING AND CONNECTING UNDERWATER RISERS," Ser. No. 121,788, filed on Mar. 8, 1971, and related to the Applicants' application entitled "APPARATUS FOR CONNECTING UNDERWATER PIPELINES" filed on an even date with this application.

BACKGROUND OF THE INVENTION

1. Field of the Invention

This invention relates generally to improvements in pipeline construction and, more particularly, but not by way of limitation, to riser section apparatus facilitating the interconnection and the underwater interconnection between pipelines to form a riser connected to an underwater pipeline.

2. Description of the Prior Art

Various methods and apparatus have been proposed in the past for constructing, installing and connecting underwater pipelines and risers. The underwater pipeline has generally been constructed of various pipeline sections interconnected aboard a barge and subsequently positioned on the water-body floor from the barge. The pipeline riser was generally constructed of the plurality of riser sections which were also interconnected aboard the barge and "stovepiped" or lowered into an interconnecting relationship with one end of the underwater pipeline. The riser sections were supported by cables generally on one side of the barge in a somewhat interconnecting relationship, and the riser-sections were then welded together at the interconnection therebetween while being thus supported.

The U.S. Pat. No. 3,534,984, issued to Shuey, disclosed a method and means for connecting the lower end of a flow conductor or riser pipe to the upper end of a pipe lying at the bottom of a body of water. A frangible disc was connected to the pipe and guide cables were secured to a flange of a female connector member, the upper end portions of the guide cables being secured to a float. The Shuey patent also disclosed a guide assembly for aligning the connecting flanges of the pipelines having a plurality of rams constructed to remain in a retracted position and, after the lower end of the riser or flow conductor was aligned with the upper end of the pipeline, hydraulic cylinders actuated the rams toward an extended position wherein the latch members engage the flange of the pipeline. When the rams were again urged upwardly via hydraulic force, the rams and latch members pulled the two pipeline connectors together. Finally, after the connection was made between the two pipeline connectors, the closure disc was broken via fluid pressure admitted to the upper end of the riser pipe.

The U.S. Pat. No. 3,599,436, issued to Lochridge disclosed a method and apparatus for welding a flowline to a conduit of an underwater installation in a manner obviating the need for sealing and coupling assemblies wherein a chamber or habitat was utilized to isolate the underwater connecting ends of the riser and underwater flowline from the body of water. A funnel was connected to the riser and a plug was connected to the underwater flowline, the funnel functioning as a guide and the plug functioning as a seal. The plug was welded or otherwise secured to the pipeline terminus and subsequently removed via mechanical or torch cutting after the two pipelines were positioned in a connecting relationship and the chamber lowered thereover.

The U.S. Pat. No. 3,258,928, issued to Broadway, disclosed an apparatus for positioning a riser coupled to a pipeline to be laid on the bed of a body of water utilizing two marine support members (a pipelaying barge and an offshore platform) utilizing a monorail coupled to one leg of the platform before installation in the body of water for positioning the riser as the riser's length is increased and lowered.

The U.S. Pat. No. 3,373,570, issued to Hindman, disclosed a method and apparatus for installing an underwater pipeline wherein the pipeline was supported on a sling and moved laterally to a position wherein hook receivers secured the pipeline to a platform. The riser was then lowered through sleeves to a connecting position, the pipeline being lowered on a rail to a position wherein a portion thereof was secured to the platform.

The U.S. Pat. No. 1,874,081, issued to Burrows, disclosed a pipe supported on supports positioned on the floor of a body of water and a second pipe lowered onto the supports via a hoisting tackle, the second pipe being moved into a connecting position with the first pipe with the aid of divers. The Burrows patent also disclosed a centering device which was removably inserted into one end of the pipe to be lowered.

The U.S. Pat. No. 3,338,596, issued to Knox, disclosed a well head connector having positioning apparatus. The U.S. Pat. No. 3,459,442, issued to DeYarmett, described an underwater coupling for connecting a flowline to a riser, the pipe sections being laid on the floor of a body of water in rough alignment, spaced a distance apart and subsequently pulled together by a diver.

The U.S. Pat. No. 3,355,899, issued to Koonce, the U.S. Pat. No. 3,410,096, issued to Schuh, and the U.S. Pat. No. 3,260,270, issued to Watkins, each disclosed a cable guiding type of alignment device wherein some type of coupling was utilized for positioning. The U.S. Pat. No. 3,483,708, issued to Marshall, disclosed a method and apparatus for anchoring pipes and the like to an underwater structure or platform during the installation of the pipe, wherein one pipe was anchored to the platform for alignment prior to lowering the pipe to effect an underwater connection. Similar devices were disclosed in the U.S. Pat. No. 3,474,630, issued to Pogonowski; the U.S. Pat. No. 3,501,919, issued to Marshall; the U.S. Pat. No. 3,517,520, issued to Hammett; the U.S. Pat. No. 3,477,236, issued to Burrus; and the U.S. Pat. No. 3,173,271, issued to Wittgenstein.

The U.S. Pat. No. 3,440,826, issued to Kline, disclosed apparatus for laying an underwater pipeline wherein a hoist, a pipe support and a pipe positioner were supported on a floating vessel. The pipe support was pivotally mounted to the barge and received an upper end portion of a pipeline for connection with another pipeline, the joints of pipe being connected at one station and suspended on a guide cable for movement to another station.

The U.S. Pat. No. 3,434,296, issued to Ottoman, disclosed apparatus and method for connecting a flowline to an offshore platform utilizing a track attached to the platform and a guide through which the underwater flowline was pulled toward the water surface. The U.S. Pat. No. 3,466,882, issued to Broussard, also disclosed a method and apparatus for installing a riser on an offshore platform which included a bending guide for bending one end of the pipe to form the riser portion.

The U.S. Pat. No. 3,434,295, issued to Manning, disclosed a submergible vehicle for connecting sections of an underwater pipeline. The U.S. Pat. No. 3,496,728, issued to Slack; the U.S. Pat. No. 3,081,113, issued to Haeber; the U.S. Pat. No. 3,466,878, issued to Esquillan; and the U.S. Pat. No. 3,429,113, issued to Hauber, each disclosed various apparatus and methods for constructing offshore platforms and the various casings and risers associated therewith. The U.S. Pat. No. 3,280,571, issued to Hauber, disclosed a device for laying flexible pipe on a submerged surface.

SUMMARY OF THE INVENTION

An object of the invention is to provide a riser section apparatus for connecting pipelines to form an underwater riser and for connecting a riser to an underwater pipeline wherein the sealing integrity between the interconnected pipelines is substantially increased.

Another object of the invention is to provide a riser section apparatus for connecting pipelines to form an underwater riser and for connecting a riser to an underwater pipeline in a safer manner, which is economical in construction and operation.

One other object of the invention is to provide a riser section apparatus for connecting pipelines to form an underwater riser and for connecting a riser to an underwater pipeline wherein the alignment of the pipelines is accomplished in a faster, more efficient and more positive manner.

A further object of the invention is to provide a riser section apparatus for connecting pipelines to form an underwater riser and for connecting a riser to an underwater pipeline wherein the required construction time is substantially reduced.

Other objects and advantages of the invention will be evident from the following detailed description when read in conjunction with the accompanying drawings which illustrate the various embodiments of the invention.

BRIEF DESCRIPTION OF THE DRAWINGS

FIG. 1 is a side elevational view of a marine support member, more particularly, a platform having a riser construction apparatus supported thereon for constructing a riser and for connecting the constructed riser to one end of an underwater pipeline.

FIG. 2 is an enlarged,, side elevational view showing a preferred embodiment of a portion of a riser support assembly constructed to be utilized in cooperation with the riser construction apparatus of FIG. 1.

FIG. 3 is a partial, enlarged sectional view showing a pair of interconnected riser sections constructed to be utilized in cooperation with the riser construction apparatus in FIG. 1.

FIG. 4 is a sectional view of the riser sections of FIG. 3, taken substantially along the lines 4—4 of FIG. 3.

FIG. 5 is a sectional view, similar to FIG. 3, but showing a modified pair of interconnected riser sections.

FIG. 6 is an enlarged, sectional view showng a portion of the riser and a portion of the underwater pipeline of FIG 1 in an interconnected position.

FIG. 7 is an enlarged sectional view, similar to FIG. 6, but showing a modified riser and underwater pipeline interconnection.

FIG. 8 is an enlarged, elevational view showing a flange alignment apparatus utilized to align the bolt holes in the riser and the underwater pipeline for bolting interconnection therebetween.

FIG. 9 is a top elevational view of the end of the underwater pipeline of FIG. 8 having the guide coupling apparatus removed therefrom, and a portion of a pin guide assembly positioned therein.

FIG. 10 is a partial, side elevational view of the flange alignment apparatus of FIG. 8.

DESCRIPTION OF THE PREFERRED EMBODIMENTS

Referring to the drawings in general, and to FIG. 1 in particular, shown therein and designated by the general reference numeral 10 is a riser construction apparatus for constructing a riser 12 by securely interconnecting a predetermined number of riser sections 14 from a support member 16, and connecting one end of the constructed riser 12 to an underwater pipeline 18. The riser construction apparatus 10 is supported in an assembled position upon the support member 16 which is, more particularly, an offshore platform or, in other words, a platform which is supported on a floor 20 of a body of water 22, a portion of the platform 16 being disposed in a body of water 22 generally below a surface 24 thereof. The platform 16 may be of the type commonly utilized with respect to various offshore operations relating to the drilling and production of oil and gas, for example, and basically comprises: a plurality of support legs 26, which are anchored in the floor 20 of the body of water 22; and a plurality of brace members 28, which are securely interconnected to the support legs 26 (only two of the brace members 28 and only two of the support legs 26 are shown in FIG. 1, for the purpose of clarity of description).

The platform 16 includes a first operating deck 30 supported thereon generally above the surface 24 of the body of water 22. A portion of the first operating deck 30 is secured to a portion of each of the support legs 26, and is generally supported on the platform 16 thereby. A second operating deck 32 is supported by the support legs 26 on the platform 16, a distance generally above the first operating deck 30. The first and the second operating decks 30 and 32 may be of the type generally adapted to support various well-drilling and servicing equipment and, in some installations, the second operating deck 32 may be removable for temporary utilization during certain portions of the overall construction operation. The construction and utilization of various offshore support members, such as the platform 16, generally described above, is well-known in the art and a detailed description thereof is not required herein.

The riser construction apparatus 10 generally includes: a riser support assembly 34 and a riser lowering assembly 36, each being supported on a portion of the first operating deck 30; and a positioning assembly 38 supported on a lower side portion of the second operating deck 32, generally between the first operating deck 30 and the second operating deck 32. The support assembly 34 and the riser lowering assembly 36 are securedly supported on a base plate 40 which is connected to a support frame 42, the riser sections 14 being securedly supported through apertures 66 formed through portions of the base plate 40, as shown more clearly in FIG. 2.

As generally shown in FIG. 1, each riser section 14 has a connecting upper end 56 and a connecting lower end 58 formed thereon. The connecting upper end 56 of each riser section 14 is shaped to interconnectingly mate with the connecting lower end 58 of another riser section 14, in such a manner that the riser sections 14 can be securely joined to form the riser 12. In a preferred form, the connecting lower end of one of the riser sections 14 is, more particularly, an underwater connecting end and is positioned or interconnected to the other riser sections 14 to form an underwater connecting end of the constructed riser 12.

A support ring 60 is formed about the outer periphery of each riser section 14, generally near the connecting upper end 56 thereof. Each support ring 60 extends a distance generally radially from one of the riser sections 14, each support ring 60 being shaped and sized to extend a sufficient distance from one of the riser sections 14 such that, when one of the riser sections 14 is lowered into a stored position through one of the apertures in the base plate 42, a portion of the support ring 60 engages a portion of the base plate 40 to cooperatingly support the riser sections 14 in a stored position therein. It should also be noted that the support ring 60 of each riser section 14 is also shaped and disposed to engagingly contact a portion of the riser support assembly 34, in one position of the riser support assembly 34, during the construction of the riser 12.

In a preferred form and as shown in FIG. 2, apertures 62 are formed through a portion of each support ring 60. The apertures 62 are spaced circumferentially about the support ring 60 and are sized and positioned on each support ring 60 to cooperate with the riser support assembly 34 for securely positioning and supporting the riser sections 14 therein. The apertures 64 also cooperate with the lowering assembly 36 such that the interconnected riser sections 14 can be lowered through the riser support assembly 34, in a manner to be described in greater detail below.

A riser opening 66 is formed through a central portion of the base plate 40, as shown in FIG. 2. The riser opening 66 is sized such that the interconnected riser sections 14 can be passed therethrough, more particularly, the riser opening 66 has a diameter larger than the largest radial diameter of any portion of any of the riser sections 14.

AS shown in FIGS. 1 and 2, the riser support assembly 34 is secured to and supported upon a portion of the base plate 40, generally about or near the riser opening 66. The riser support assembly 34 has a support position, and is constructed to securely position and to supportingly engage one of the riser sections 14 or, more particularly, a portion of the support ring 60 of one of the riser sections 14, in a support position of the riser support assembly 34. The riser support assembly 34 also has a release portion, and is constructed to non-engagingly pass the interconnected riser sections 14 therethrough, in a release position thereof, in a manner to be described in greater detail below.

The riser support assembly 34 includes a pair of support arm assemblies 70 secured to a portion of the base plate 40, generally adjacent the riser opening 66, and a pair of actuator assemblies 72 which are secured to a portion of the base plate 40. Each actuator assembly 72 is connected to one of the support arm assemblies 70 to move the support arm assemblies 70 to a support position and a release position, in a manner to be described in detail below.

Each support arm assembly 70 includes a support arm 74, as shown more clearly in FIG. 2. Each support arm 74 has a pivot end 76 and a support end 78. The pivot end 76 of each support arm 74 is pivotally secured to the support member 16 and, more particularly, each pivot end 76 is pivotally secured to a flange 80 via a pin 82, as shown more clearly in FIG. 2. Each flange 80 is secured to the base plate 40, and positioned thereon such that, in the assembled position of the riser support assembly 34 the support arms 74 are spaced circumferentially at predetermined intervals.

In a preferred form, each support arm 74 has a base 84 formed on the support end 78 thereof, and each base 84 has an upper supporting surface 86 formed thereon. A locating pin 88 is formed or, more particularly, secured to a portion of the upper surface 86 of each base 84. Each locating pin 88 extends generally perpendicularly from the upper surface 86, and is sized to positioningly extend through a portion of one of the apertures 62 of the riser section 14 being supported by the riser support assembly 34, to position each riser section 14 in a support position of the riser support assembly 34, and in one position of each riser section 14.

As shown more clearly in FIG. 2, the support ring 60 of each riser section 14 has an upper surface 90 and a lower surface 92. The lower surface 92 of each support ring 60 is shaped to engage a portion of the upper surface 86 of each support arm 74, in a support position of one of the riser sections 14 with respect to the riser support assembly 34, as shown in FIGS. 1 and 2.

Each actuator assembly 72, more particulary, includes a cylinder actuator 93, having a piston arm 94 reciprocatingly disposed therein. The end of each cylinder actuator 93, opposite the piston arm 94 end thereof, is pivotally secured to a flange 95, which is secured to a portion of the base plate 40 via a pivot pin 96. The end of each piston arm 94 opposite the end thereof reciprocatingly dispoed in one of the cylinder actuators 93 is pivotally secured to a flange 97, formed on a portion of each support arm 74 and extending generally perpendicularly therefrom.

The riser lowering assembly 36 is constructed to guidingly lower the constructed riser 12 in a direction generally toward the underwater pipeline 18 to a position wherein the riser 12 connectingly engages the underwater pipeline 18 and includes a pair of winch assemblies 100 supported on the base plate 40, each winch assembly 100 having a winch cable 102 connected thereto and removably connected to a portion of the interconnected riser sections 14. More particularly, a connecting end 106 of each winch cable 102 is removably connected to the support ring 60 of one of the riser sections 14 and a portion of each winch cable 102 is disposed in guiding engagement with a guide pulley 108 secured to a portion of the platform 16.

The positioning assembly 38 includes an overhead crane assembly 110 which is rollingly connected to a transverse track assembly 112. The transverse track assembly 112 is rollingly connected to a lateral track assembly 113. A cran support frame 116 is rollingly connected to the transverse track assembly 112 via a plurality of interconnecting roller assemblies 118 and a crane winch 120 is supported on a portion of the crane support frame 116. A crane cable 122 has one end connected to the crane winch 120 and a riser section connector 124 is secured on the opposite end of the crane cable 122. The transverse track assembly 112 is rollingly connected to the lateral track assembly 113 via a plurality of roller assemblies 119. The crane winch 120 is driven by a winch drive 126 supported on a portion of the crane support frame 116.

The underwater pipeline 18 is constructed of a plurality of interconnected pipe-sections and an underwater connecting end 140 is connected to one end of the underwater pipeline 18. The underwater connecting end 140, referred to sometimes below as the pipeline underwater connecting end 140, is constructed to interconnectingly engage one end of the constructed riser 12, in one position of the constructed riser 12 and the underwater pipeline 18.

A guide coupling assembly 142 is removably disposed in a portion of the underwater pipeline 18 generally near the end of the underwater pipeline 18 having the underwater connecting end 140 connected thereto, as shown in FIG. 1. A portion of the guide coupling assembly 142 is shaped and disposed to guidingly engage a portion of the constructed riser 12, generally near an underwater connecting end 144 thereof, to guide the constructed riser 12 to a position wherein the underwater connecting end 144 of the constructed riser 12 connectingly engages a portion of the underwater connecting end 140 of the underwater pipeline 18, in a manner to be described in greater detail below.

As mentioned before, each of the riser sections 14 has a connecting upper end 56 and a connecting lower end 58; however, in a preferred form and as shown in FIG. 1, one of the riser sections 14 has an upper end 56 and the underwater connecting end 144 is connected to the end thereof opposite the upper end 56 thereof. The riser sections 14 are interconnected to form the constructed riser 12 such that the underwater connecting end 144 connected to the one riser section 14 forms the lowermost end or the underwater connecting end 144 of the constructed riser 12. It is apparent from the foregoing that the constructed riser 12 is formed from a predetermined number of riser sections 14 wherein one of the riser sections 14 has an upper end 56 and an underwater connecting end 144, and each other riser section 14 has an upper end 56 and a lower end 58. The riser sections 14 are interconnected such that the connecting upper end 56 of some of the riser sections 14 is interconnected to the connecting lower end 58 of one other riser section 14 to form the constructed riser 12.

The riser construction apparatus 10 also includes a flange alignment assembly 146 which is supported generally between the underwater connecting end 144 of the one riser section 14 and the underwater connecting end 140 connected to the underwater pipeline 18. The flange alignment assembly 146 is constructed to align the bolt holes (not shown in FIG. 1) of the underwater connecting end 140 connected to the underwater pipeline 18 with the bolt holes through a portion of the underwater connecting end 144 of the one riser section 14 for bolting interconnection therebetween, in a manner and for reasons which will be described in greater detail below.

The riser construction apparatus 10, described above, is constructed and positioned to facilitate the construction of the riser 12 from the support member 16, and to position the lowermost end of the constructed riser 12, that is the underwater connecting end 144 thereof, in an interconnectingly engaging position with the underwater connecting end 140 of the underwater pipeline 18, so that the constructed riser 12 can be safely and securedly joined to the underwater pipeline 18.

During the construction of the riser 12, the overhead crane assembly 110 is transversely and laterally positioned on the transverse track assembly 112 and the lateral track assembly 113, respectively, generally over or above one of the stored riser sections 14. The winch drive 126 is then actuated to a lowering position, thereby lowering the crane cable 122 in a downwardly direction generally toward the base plate 40. The crane cable 122 is lowered to a position wherein the riser section connector 124 is disposed generally near the connecting upper end 56 of one of the riser sections 14. The operator then secures the riser section connector 124 to the riser section 14 or, more particularly, to the support ring 60 of the riser section 14.

After the riser section connector 124 is secured to one of the riser sections 14, the winch drive 126 is then actuated to a raising position wherein the crane cable 122 is retrieved on the crane winch 120 or, in other words, wherein the crane cable 122 is moved in an upwardly direction generally toward the positioning assembly 38, thereby raising the riser section 14 connected thereto via the riser section connector 124. The overhead crane assembly 110 will continue to move the riser section 14 connected thereto in an upwardly direction to a position wherein the connecting lower end 58 of the riser section 14 is disposed a distance vertically above the base plate 40 and thus removed from the support apertures 54.

The operator will then move the overhead crane assembly 110 transversely across the transverse track assembly 112 and move the transverse track assembly 112 laterally across the lateral track assembly 113 to a position wherein the riser section 14 connected thereto is disposed generally above the riser support assembly 34. The overhead crane assembly 110 or, more particularly, the winch drive 126 is then actuated to a lowering position, thereby lowering the riser-section 14 connected thereto in a generally downwardly direction toward the base plate 40.

The riser section 14 is lowered by the overhead crane assembly 110 as described above, through the space between the support arm assemblies 70 and through the riser opening 66 to a position wherein the lower surface 92 of the support ring 60 is supportingly engaged by the upper surface 86 of each support arm assembly 70. In a preferred form, the riser section 14 being lowered through the riser opening 66 is also positioned such that each locating pin 88, disposed on the support arms 74, is partially disposed through one of the position apertures 62 in the support ring 60, as shown more clearly in FIG. 2.

The supported riser section 14, that is the particular riser section 14 supported in the riser support assembly 34, is thus secured in a predetermined horizontal plane via the engagement between a portion of the lower surface 92 of the support ring 60 and the supporting surface 86 of each support arm 74. The supported riser section 14 is also securedly supported in a predetermined axial position via the locating pins 88, each of which is disposed through one of the position apertures 62 in the support ring 60. The locating pins 88, more particularly, engage a portion of the support ring 60 and cooperate to limit or virtually prevent any rotational movement of the supported riser section 14, about an axial axis, for reasons which will be made more apparent below.

It should be noted that, in a preferred form, the first riser section 14 supported in the riser support assembly 34 is, more particularly, that one riser section 14 having the underwater connecting end 144 connected thereto. The operator will then release and remove the riser section connector 124 from the support ring 60 of the supported riser section 14, thereby disconnecting the supported riser section 14 from the positioning assembly 38. The winch drive 126 of the positioning assembly 38 is then actuated to a raising position, and the overhead crane assembly 110 is then moved laterally and transversely on the track assemblies 112 and 113 to a position wherein the overhead crane assembly 110 is disposed generally above another or a subsequent riser section 14. The winch drive 126 is then actuated to a lowering position, thereby lowering the riser section connector 124 to a position for interconnection thereof to the subsequent riser section 14.

After the riser section connector 124 is secured to the support ring 60 of the riser section 14, the winch drive 126 is then actuated to a raising position, thereby raising the riser section 14 connected thereto. The riser section 14 is raised in a generally upwardly direction and removed from the support aperture 54. The overhead crane assembly 110 is then laterally and transversely positioned over the base plate 40 to a position wherein the riser section 14 connected thereto is disposed generally over the riser support assembly 34. The overhead crane assembly 110 is then actuated to a lowering position, thereby lowering the riser section 14 connected thereto generally toward the riser support assembly 34 or, more particularly, generally toward the supported riser section 14 which is securely supported in the riser support assembly 34. The riser section 14 supported by the positioning assembly 38 is lowered to a position wherein the connecting lower end 58 thereof is positioned in a mating, interconnecting relationship with respect to the connecting upper end 56 of the riser section 14, which is supported in the riser support assembly 34.

After the connecting lower end 58 of the riser section 14 supported by the positioning assembly 38 is them moved into a mating, interconnecting relationship with respect to the connecting upper end 56 of the riser section 14 supported in the riser support assembly 34, the two riser sections 14 are then secured together such as, for example, by welding or bolting two riser sections 14 together. The riser support assembly 34 maintains the riser section 14 supported therein in a firm and secure position such that the movement of the supported riser section 14 is substantially reduced or virtually eliminated. The positioning assembly 38 cooperates to maintain the position of the riser section 14 connected thereto in a manner relatively free of movement, and connecting upper end 56 and connecting lower end 58 of each riser section 14 is also shaped in a preferred form, to cooperate with the riser support assembly 34 and the positioning assembly 38 to maintain the interconnecting disposition of the riser sections 14 during the welding or other interconnecting operation to assure a sealingly secure interconnection between the two riser sections.

After the two riser sections 14 have been secured in an interconnected relationship, as described above, the winch drive 126 of the positioning assembly 38 is actuated to a raising position, thereby raising the two interconnected riser sections 14 in a generally upwardly, vertical direction. The two interconnected riser sections 14 are raised upwardly by the positioning assembly 38 to a position wherein the riser support assembly 34 is disengaged from the riser section 14 supported thereby. Each connecting end portion 106 of the riser lowering assembly 36 is then removably, securedly connected to the support ring 60 of the riser section 14, thereby connecting the riser lowering assembly 36 to a portion of the partially constructed riser 12.

After the riser support assembly 34 has been positioned in the release position, the overhead crane assembly 110 is actuated to a lowering position, thereby lowering the two interconnected riser sections 14 through the riser support assembly 34 through the riser opening 66, to a position wherein the connecting upper end 56 of the last connected riser section 14 is disposed in a horizontal plane generally above the riser support assembly 34. The riser support assembly 34 is then actuated to a support position, as described before, and the interconnected riser sections 14 are further lowered to a position wherein the connecting upper end portion 56 of the last connected riser section 14 is securedly and supportingly engaged by the riser support assembly 34, in a manner similar to that described in detail before with respect to the riser section 14 first supportingly positioned in the riser support assembly 34.

The riser section connector 124 is then disconnected from the riser section 14, and the two interconnected riser sections 14 are then securedly supported and positioned in a predetermined horizontal plane by the riser support assembly 34, in a manner similar to that described before. The positioning assembly 38 is then utilized to move another riser section 14 to a position wherein the connecting lower end 58 of that riser section 14 is matingly and interconnectingly disposed with respect to the connecting upper end 56 of the riser section 14 supported in the riser support assembly 34, in a manner similar to that described above. The connecting lower end 58 of the riser section 14 supported by the positioning assembly 38 is then secured to the connecting upper end 56 of the riser section 14 supported in the riser support assembly 34, in a manner similar to that described above. The positioning assembly 38 is actuated to disengage the supported riser sections 14 from the riser support assembly 34, and to lower the interconnected riser sections 14 through the riser support assembly 34 and through the riser opening 66 to a position wherein the connecting upper end 56 of the last connected riser section 14 is securedly and supportingly engaged by the riser support assembly 34.

After the riser sections 14 have been securedly interconnected to form the constructed riser 12, the riser lowering assembly 36 is utilized to lower the constructed riser 12 in a generally downwardly direction toward the underwater connecting end 140 connected to the underwater pipeline 18. The riser lowering assembly 36 is, more particularly, utilized to lower the constructed riser 12 to a position wherein the underwater connecting end 144 thereof is positioned in mating and interconnecting engagement with the underwater connecting end 140 of the underwater pipeline 18, as will be described in greater detail below.

In one form, the riser lowering assembly 36 can be utilized solely to lower the constructed riser 12, and the positioning assembly 38 can be utilized to provide a stationary, augmenting support for the interconnected riser sections 14 during the lowering thereof. In another form, the riser lowering assembly 36 and, more particularly, the winch cables 102 thereof can be utilized solely to lower the constructed riser 12.

In a preferred form, and as will be described in greater detail below, the guide coupling assembly 142 and the flange alignment assembly 146 are each disposed in a portion of the underwater pipeline 18 generally near the underwater connecting end 140 thereof. The guide coupling assembly 142 and the flange alignment assembly 146 each cooperate to position the underwater connecting end 144 of the constructed riser 12 in an interconnecting relationship with respect to the underwater connecting end 140 of the underwater pipeline 18. More particularly, the guide coupling assembly 142 guidingly engages the underwater connecting end 144 of the constructed riser 12 to guide the underwater connecting end 144 in an interconnecting relationship with respect to the underwater connecting end 140 of the underwater pipeline 18, as the constructed riser 12 is lowered in a generally downwardly direction toward the underwater connecting end 140 of the underwater pipeline 18. The flange alignment assembly 146, more particularly, cooperates to align the bolt holes of the underwater connecting end 144 with the bolt holes of the underwater connecting end 140 for bolting interconnection therebetween in a manner which will be described in more detail below.

The riser lowering assembly 36 will be actuated to initially lower the constructed riser 12 to a position wherein the underwater connecting end 144 thereof is disposed in a horizontal plane generally above the underwater connecting end 140 of the underwater pipeline 18. The riser lowering assembly 36 is then utilized to maintain the constructed riser 12 in a predetermined horizontal plane until such time as the underwater interconnection between the constructed riser 12 and the underwater pipeline 18 can be effected by a diver. The diver will position himself generally near the underwater connecting ends 140 and 144 of the pipeline 18 and the constructed riser 12, respectively, and then, in a preferred form, the riser lowering assembly 36 will be actuated to further lower the constructed riser 12 to a position wherein the underwater connecting end 144 of the riser 12 interconnectingly and matingly joins the underwater connecting end 140 of the underwater pipeline 18. The diver will then secure the constructed riser 12 to the underwater pipeline 18 such as, for example, by bolting or by bolting and welding the underwater connecting end 144 of the riser 12 to the underwater connecting end 140 of the underwater pipeline 18.

It will be apparent from the foregoing that the riser construction apparatus 10, shown in FIGS. 1 and 2, thus provides an apparatus and a method for constructing an underwater riser in a safe and efficient manner, and a manner assuring a sealingly secure interconnection between the various riser sections 14 and between the underwater interconnecting ends of the riser and the underwater pipeline. The two riser sections 14 which are being interconnected during any one portion of the operation of the riser construction apparatus 10 are securedly positioned in an interconnecting relationship by the riser support assembly 34 and the riser positioning assembly 38, thereby substantially reducing or virtually eliminating relative movement between the two riser sections 14 being thus interconnected. In those instances where the interconnection between the two riser sections must be effected while relative movement between the two riser sections is occurring, as in the past, the interconnecting weld material or the seal element disposed between the end of the two riser sections being interconnected will be continually fractured, cracked or damaged, thus making it virtually impossible to assure a sealingly secure interconnection.

The riser construction apparatus 10 is particularly adapted to be supported by a marine support structure 16, such as the platform 16, shown in FIGS. 1 and 2, thereby permitting the various technical personnel responsible for the construction of the riser 12 to perform their various responsibilities and functions from a stable supporting structure, and further since the relative movement between the two riser sections 14 being interconnected is virtually eliminated, their various functions and responsibilities can be effected under safer, overall working conditions. It should also be noted that since the two riser sections 14 are securedly positioned and supported in a mating and interconnected relationship during the interconnecting operation, in a manner as described above, the various riser sections 14 can be interconnected to form the constructed riser 12 independent of the particular condition of the body of water 22 into which the constructed riser 12 will ultimately be disposed. More particularly, the interconnection between the various riser sections 14 can be effected utilizing the riser construction apparatus 10 even during those times when a high tide or a rough water condition exists with respect to the body of water 22 generally about or near the maring support structure 16, thereby effecting the construction of the riser 12 in a more efficient manner. The details of the construction and operation of the various components and assemblies generally referred to above are fully described in the Applicants' co-pending application entitled "METHOD AND APPARATUS FOR CONSTRUCTING AND CONNECTING UNDERWATER RISERS," Ser. No. 121,788, referred to before.

Referring more particularly to FIGS. 3 and 4, one preferred embodiment of each riser section 14 having the connecting upper end 56 and the connecting lower end 58 is shown in detail in FIGS. 3 and 4. More particularly, the connecting upper end 56 of a riser section 14 is shown in FIGS. 3 and 4 in an interconnected relationship with respect to the connected lower end 58 of another riser section 14. The two riser sections 14, shown in FIGS. 3 and 4, have been sealingly secured in an interconnecting relationship by welding a portion of the connecting upper end 56 of one of the riser sections 14 to a portion of the connected lower end 58 of the other riser section 14.

Although the following description will relate particularly to the two riser sections 14, as shown in FIGS. 3 and 4, it is contemplated in this embodiment of the invention that each of the riser sections 14 utilized to construct the riser 12 includes a connecting upper end 56 and a connecting lower end 58 constructed in a manner as particularly described below with respect to the riser sections 14, shown in FIGS. 3 and 4. As mentioned before, one of the riser sections 14 includes the underwater connecting end 144, and with respect to that one riser section 14, only the description of the connecting upper end 56 below is applicable, in a preferred form.

Referring more particularly to the connecting upper end 56, as shown more clearly in FIG. 3, an uppermost end 200 thereof is beveled, thereby forming a beveled surface 202 extending about the outer periphery of the riser section 14, generally adjacent the uppermost end 200 thereof. A groove 204 is formed in the inner periphery of the connecting upper end 56, extending a distance axially along the inner periphery thereof, and intersecting a portion of the uppermost end 200 thereof. The groove 204 terminates with a beveled end 206. The beveled end 206, more particularly, forms an annular beveled surface 206 which extends about the inner periphery of the connecting upper end 56, and is positioned therein to matingly abut a portion of the connecting lower end 58 of an adjoining riser section 14, in a manner which will be made more apparent below.

The support ring 60 is formed on a portion of the outer periphery of the connecting upper end 56, and extends a distance generally radially therefrom. The support ring 60 extends about the entire outer periphery of the connecting upper end 56, generally near the uppermost end 200 thereof.

As shown more clearly in FIG. 3, a groove 208 is formed in a portion of the outer periphery of the connecting lower end 58, the groove 208 intersecting a portion of a lowermost end 210 of the connecting lower end 58. More particularly, the lowermost end 210 of the connecting lower end 58 is beveled, thereby forming an annular beveled surface 212 which extends about the outer periphery of the connecting lower end 58, generally adjacent the lowermost end 210 thereof. The beveled surface 212 matingly and positioningly engages the beveled surface 206 formed in the connecting upper end 56 of an adjoining riser section 14, in an interconnecting position of the two riser sections 14.

The groove 208, as shown in FIG. 3 also extends a distance axially along the outer periphery terminating with an annular end surface 213 which intersects a portion of the outer periphery of the connecting lower end 58. The annular end surface 213 is beveled, thereby forming a beveled surface 213 extending about the outer periphery of the connecting lower end 58. In an assembled or interconnecting position of two riser sections 14, the uppermost end 200 of the connecting upper end 56 engages a portion of the end surface 213 and, in this position, the beveled surface 202 formed on the connecting upper end 56 cooperates with the beveled surface 213 formed on the connecting lower end 58 of the adjoining riser section 14 to form a V-shaped groove 214 which extends about the outer periphery of the interconnected riser sections 14, as shown more clearly in FIG. 3. The V-shaped groove 214 provides a space wherein weld material is disposed so that the two riser sections 14 can be weldingly joined in an interconnected relationship, during the construction of the riser 12, as described before.

In a preferred form, and as shown in FIG. 3, the connecting upper end 56 and the connecting lower end 58 of the riser sections 14 are constructed as a separate component, and subsequently secured to a pipe section 216 to form each riser section 14. The connecting upper end 56 and the connecting lower end 58 will therefore be sometimes used below to refer to the separate, individual components which are secured to the pipe section 216 to form the riser sections 14.

In this embodiment of the invention, that is where the connecting upper end 56 and the connecting lower end 58 are constructed as separate, individual components, each connecting lower end 58 includes an upper end 218 which is secured, or more particularly, welded to a lower end 220 of one of the pipe sections 216. As shown in FIG. 3 and in a preferred form, the upper end 218 of the connecting lower end 58 is beveled, and the lower end 220 of the pipe section 216 is also beveled. The beveled surfaces 218 and 220 of the connecting lower end 58 and the pipe section 216, respectively, form a V-shaped groove 221 in an interconnected position of the connecting lower end 58 and one of the pipe sections 216 to facilitate the welding interconnection therebetween, as shown in FIG. 3. Each connecting upper end 56, in this embodiment of the invention, includes a lower end 222 which is secured or, more particularly, welded to an upper end 224 of one of the pipe sections 216. The lower end 222 and the upper end 224 of the connecting upper end 56 and the pipe section 216, respectively, are beveled, and form a V-shaped groove 226 in an interconnected position of the connecting upper end 56 and one of the pipe sections 216 to facilitate the welding interconnection therebetween, as shown in FIG. 3.

It should be noted that the salient reason for forming the connecting lower end 58 and the connecting upper end 56 as separate, individual components, and subsequently securing each connecting end 56 and 58 to the pipe sections 216 is to facilitate the manufacture of the riser sections 14. Since each connecting end 56 and 58, in a preferred form, requires a certain amount of machining to form the various beveled and tapered surfaces thereon, the forming of the connecting ends 56 and 58 as a separate, individual component reduces the cost of manufacture of the constructed riser sections 14, and with respect to a riser section 14 having an extremely large diameter, it should be noted that, in some instances, it may be extremely difficult to accurately machine the connecting ends 56 and 58 on the pipe sections 216.

The connecting upper end 56 and the connecting lower end 58, described in detail above, not only facilitate the effecting of the interconnection between two riser sections 14, but also are constructed to facilitate the guiding of the connecting lower end 58 of one of the riser sections 14 into an adjoining and mating relationship with respect to the connecting upper end 56 of another riser section 14, during the construction of the riser 12, as described above with respect to FIGS. 1 and 2. More particularly, utilizing the riser sections 14, constructed as shown in FIGS. 3 and 4, one of the riser sections 14 is securedly and supportingly positioned in the riser support assembly 34 such that the connecting upper end 56 of the riser section 14 thus supported is disposed generally above the support arm assemblies 70 of the riser support assembly 34.

The positioning assembly 38 is then utilized to move another riser section 14 to a position wherein the connecting lower end 58 of the riser section 14 supported thereby is disposed in a horizontal plane generally above the supported riser section 14. The operator will then actuate the positioning assembly 38 to a lowering position, thereby lowering the riser section 14 connected thereto in the direction generally toward the connecting upper end 56 of the supported riser section 14.

As the riser section 14 is lowered by the positioning assembly 38, the beveled surface 212 of the connecting lower end 58 will initially engage a portion of the uppermost end 200 of the connecting upper end 56 of the supported riser section 14 to guide the connecting lower end 58 into an interconnecting and mating relationship with respect to the connecting upper end 56 of the supported riser section 14. More particularly, the connecting lower end 58 is guided into an interconnecting and mating position wherein the surface formed by the groove 204 of the connecting upper end 56 engagingly and slidingly receives the surface formed in the connecting lower end 58 by the groove 208 therein. The riser section 14 supported by the positioning assembly 38 is further lowered to a position wherein the beveled surface 212 formed on the connecting lower end 58 positioningly engages the beveled surface 206 formed about the inner periphery of the connecting upper end 56.

The connecting lower end 58 and the connecting upper end 56 cooperate to maintain the riser section 14 supported in the riser support assembly 34 in an interconnecting and adjoining relationship with respect to the riser section 14 supported by the positioning assembly 38 while the interconnecting weld is effected by the various operating personnel, the interconnecting and adjoining weld between the two riser sections 14 being made generally in the area between the two riser sections 14 formed by the V-shaped groove 214.

Embodiment of FIG. 5.

Shown in FIG. 5 is a modified embodiment of the connecting lower end 58a which may be preferred in some applications. The connecting lower end 58a is constructed similar to the connecting lower end 58, shown in FIGS. 3 and 4, the salient difference being that a beveled surface 230 is formed about the inner periphery of the connecting lower end 58a, generally adjacent the lowermost end 210a thereof.

The beveled surface 230 extends about the inner periphery of the connecting lower end 58a and is shaped and positioned to cooperate with the beveled surface 206 formed about the inner periphery of the connecting upper end 56, such that when two riser sections 14 are placed in an interconnecting and adjoining relationship, as described before, the beveled surfaces 206 and 230 form a V-shaped grooves 232, as shown in FIG. 5. The V-shaped groove 232 extends about the inner periphery of the two adjoining riser sections 14, and is positioned therebetween to facilitate an additional welding interconnection between the two adjoining riser sections 14 about the inner periphery thereof, generally adjacent the interconnection therebetween.

Operation of FIG. 5

The connecting upper end 56 and the connecting lower end 58a, as shown in FIG. 5, will operate similar to the connecting upper end 56 and the connecting lower end 58, as shown in FIGS. 3 and 4. The salient difference resulting from utilization of the connecting lower end 58a being that an additional interconnecting weld may be effected between the two adjoining riser sections 14.

This particular embodiment of the invention, as shown in FIG. 5, may be particularly useful when constructing a riser 12 wherein the riser sections 14 have a relatively large inner diameter. In this embodiment of the invention, the various riser sections 14 are preferably interconnectingly joined in a manner similar to that described before. The underwater connecting end 144 of the constructed riser 12 is then secured to the underwater connecting end 140 of the underwater pipeline 18. The accumulated water in the constructed riser 12 is then removed, in a manner to be described below, and a welder on a supporting platform is lowered downwardly through the constructed riser 12, in such a manner that the welder can effect each additional welding interconnection in the area formed by the V-shaped grooves 232.

It will be apparent to those skilled in the art from the foregoing, that the embodiment of the riser construction apparatus 10 retains all of the advantages described before with respect to the embodiment shown in FIGS. 3 and 4, and in addition, provides riser sections 14 which can be more securely bonded or welded in an interconnecting relationship to form the completed, constructed riser 12.

Embodiment of FIG. 6

In one form, the underwater connecting end 144 of the riser 12 could be constructed substantially the same as the connecting lower end 58, described in detail above. In that form of the invention, the underwater connecting end 140 of the underwater pipeline 18 should be constructed substantially the same as the connecting upper end 56, described in detail above, with the exception of the support ring 60 which would not be necessary, as will be apparent to those skilled in the art. However, in a preferred form, the underwater connecting end 140 of the underwater pipeline 18 and the underwater connecting end 144 of the lowermost riser section 14 of the constructed riser 12 are constructed in a different manner to facilitate the underwater interconnection therebetween. A preferred embodiment of the underwater connecting end 140 connected to the underwater pipeline 18 and the underwater connecting end 144 connected to the constructed riser 12, and a preferred embodiment of the guide coupling assembly 142 are shown in FIG. 6.

As shown more clearly in FIG. 6, the underwater connecting end 140 of the underwater pipeline 18 and the underwater connecting end 144 of the constructed riser 12 are each constructed as a separate, individual component, the underwater connecting end 140 being secured to one end of one of the pipe sections forming the underwater pipeline 18 and the underwater connecting end 144 being secured to the lowermost end of the first connected or the lowermost riser section 14. The underwater connecting end 140 is thus sometimes referred to below as the pipeline underwater connecting end 140, and the underwater connecting end 144 is sometimes referred to below as the riser underwater connecting end 144.

Referring more particularly to the underwater connecting end 140, as shown more clearly in FIG. 6, the underwater connecting end 140 has an uppermost end 300 and a lower end 302. The lower end 302 of the underwater connecting end 140 is secured to an upper end 304 of the underwater pipeline 18 and, in a preferred form, the lower end 302 of the underwater connecting end 140 and the end 304 of the underwater pipeline 18 are each beveled such that when the underwater connecting end 140 is placed in an interconnecting relationship with respect to the underwater pipeline 18, the beveled ends 302 and 304 form a V-shaped groove 306 which extends about the periphery of the interconnection therebetween. The V-shaped groove 306 is provided to facilitate the welding interconnection between the underwater connecting end 140 and the underwater pipeline 18, as shown in FIG. 6.

The underwater connecting end 144 has a beveled upper end 308 and a beveled lowermost end 310. As shown more clearly in FIG. 6, the upper end 308 of the underwater connecting end 144 is secured to a beveled lowermost end 312 of the lowermost riser section 14 of the constructed riser 12. IN an assembled position of the underwater connecting end 144, the upper end 308 thereof and the lowermost end 312 of the constructed riser 12 cooperate to provide or form a V-shaped groove 314 to facilitate the welding interconnection between the one riser section 14 and the underwater connecting end 144.

An annular flange 316 is formed on the outer periphery of the underwater connecting end 140. The flange 316 extends generally radially from the outer periphery of the underwater connecting end 140, and has a plurality of bolt holes (not shown) formed therethrough and spaced circumferentially thereabout, for reasons which will become more apparent below.

An annular raised face 318 is formed on a portion of the flange 316, the uppermost end of the raised face 318 forming the uppermost end 300 of the underwater connecting end 140. The raised face 318 extends circumferentially about the underwater connecting end 140, and cooperates with the flange 316 to provide what is generally referred to in the art as a raised face flange connection on the underwater connecting end 140 of the underwater pipeline 18.

A groove 320 is formed in a portion of the inner periphery of the underwater connecting end 140, extending a distance axially along the inner periphery thereof, terminating with a beveled end 322. The beveled end 322 formed in the underwater connecting end 140, more particularly, forms a beveled surface 322 which extends about the inner periphery of the underwater connecting end 140. The beveled surface 322 of the underwater connecting end 140 cooperates with the beveled end 310 of the underwater connecting end 144 to form a V-shaped locking groove 324 in an interconnected position of the underwater connecting ends 140 and 144. The V-shaped locking groove 324 is provided to facilitate the welding interconnection and to cooperatingly engage a portion of the guide coupling assembly 142 to position the guide coupling assembly 142 in the underwater pipeline 18, as will be described in greater detail below.

As shown more clearly in FIG. 6, a radially outwardly tapering surface 326 is formed in a portion of the groove 320, thereby forming an annular tapered surface 326 extending about the inner periphery of the underwater connecting end 140. A portion of the tapered surface 326 intersects the uppermost end 300 of the underwater connecting end 140. The surface formed by the groove 320 and the annular tapered surface 326 of the underwater connecting end 140 is shaped to guidingly and contactingly engage a portion of the underwater connecting end 144, as will be described in more detail below.

An annular flange 328 is formed about a portion of the outer periphery of the underwater connecting end 144, generally between the upper end 308 and the lower end 310 thereof. The annular flange 328 extends a distance generally radially from the underwater connecting end 144, thereby forming an annular upwardly facing surface 329 and an annular downwardly facing surface 330, each extending about the outer periphery of the underwater connecting and 144. The downwardly facing surface 330 formed by the flange 328 is positioned on the underwater connecting end 144 to contactingly engage a portion of the uppermost end 300 of the underwater connecting end 140, in an interconnected position of the constructed riser 12 and the underwater pipeline 18.

The uppermost end 300 of the underwater connecting end 140 and the downwardly facing surface 330 of the underwater connecting end 144 are each shaped to receive a seal gasket 332 which is sealingly disposed therebetween. In one form, the seal gasket 332 could provide the sealing integrity between the constructed riser 12 and the underwater pipeline 18 and, in another form, the seal gasket 332 provides a temporary fluid seal between the constructed riser 12 and the underwater pipeline 18 to sealingly prevent the leakage of fluid therebetween until such time as the welding interconnection can be effected. In this latter form, the seal gasket 332 remains in position to augment the primary sealing integrity provided by the welding interconnection formed between the constructed riser 12 and the underwater pipeline 18.

As shown in FIG. 6, a groove 334 is formed in a portion of the outer periphery of the underwater connecting end 144 of the constructed riser 12, extending a distance axially along the outer periphery thereof. A radially outwardly tapering surface 336 is formed in a portion of the groove 330, thereby forming annular tapered surface 336 extending about the outer periphery of the underwater connecting end 144 and intersecting a portion of the outer periphery thereof. The surfaces formed in the underwater connecting end 144 of the groove 334 and the tapered surface 336 are each shaped to guidingly and matingly engage the surfaces formed in the underwater connecting end 140 by the groove 320 and the tapered surface 326, respectively, to position the constructed riser 12 in an interconnecting relationship with respect to the underwater pipeline 18.

As shown in FIG. 6, an annular slip ring 338 is disposed about the underwater connecting end 144 of the one riser section 14. More particularly, the upwardly facing surface 329 of the flange 328 is shaped to slidingly and supportingly engage the slip ring 338, thereby supporting the slip ring 338 on the underwater connecting end 144 in one direction. A plurality of bolt holes (not shown) are formed through the slip ring 338, and the bolt holes formed therethrough are spaced circumferentially about the slip ring 338 to cooperatingly align with the bolt holes (not shown) formed through the flange 316, such that in the interconnecting and assembled position of the constructed riser 12 and the underwater pipeline 18, shown in FIG. 6, the bolt holes of the slip ring 338 and the bolt holes of the flange 316 receive a plurality of interconnecting bolts 340.

It should be noted that, in an alternate form, a flange could be formed on the outer periphery of the underwater connecting end 144 having the bolt holes formed therethrough in lieu of the slip ring type of connecting end described above. Although this alternate form may, in some instances, be less expensive to manufacture, the slip ring type of connecting end is preferred, since it does facilitate a quicker, more efficient alignment of the bolt holes for the underwater bolting interconnection.

The construction and the operation of the guide coupling assembly 142 is described in detail in the Applicants' co-pending application entitled "METHOD AND APPARATUS FOR CONSTRUCTING AND CONNECTING UNDERWATER RISERS," Ser. No. 121,788, filed on Mar. 8, 1971, and in the Applicants' co-pending application entitled "APPARATUS FOR CONNECTING UNDERWATER PIPELINES," filed on even date herewith. The connecting ends 140 and 144 are also constructed to cooperate with the guide coupling assembly 142 in a manner described in the above-mentioned applications.

Embodiment of FIG. 7

Shown in FIG. 7 is a modified underwater connecting end 140a and a modified underwater connecting end 144a which may be utilized in cooperation with the underwater pipeline 18 and the constructed riser 12, respectively, in some applications. The salient difference between the underwater connecting end 140a, shown in FIG. 7, and the underwater connecting end 140, shown in FIG. 6, is that the tapered surface 326a formed in the underwater connecting end 140a extends downwardly from the upper end 300, terminating with the beveled surface 322a formed about the inner periphery of the underwater connecting end 140a. The salient difference between the underwater connecting end 144a, shown in FIG. 7, and the underwater connecting end 144, shown in FIG. 6, is that the tapered surface 336a formed on the outer periphery of the underwater connecting end 144a extends downwardly along the outer periphery of the underwater connecting end 144a, intersecting the lower end 310a thereof. In other words, the underwater connecting end 144a and the underwater connecting end 140a have single tapered mating surfaces to form the guiding interconnection therebetween.

Operation of FIG. 7

The underwater connecting end 144a and the underwater connecting end 140a, shown in FIG. 7, will operate substantially the same as the underwater connecting end 144 and the underwater connecting end 140, shown in FIG. 6, described in detail before. The tapered mating surfaces 326a and 336a cooperate to position the underwater connecting end 144a of the constructed riser 12 in mating and interconnecting engagement with the underwater connecting end 140a of the underwater pipeline 18.

The additional sealing securedness of a welded interconnection between the underwater connecting end 144a and the underwater connecting end 140a is still effected generally in the groove 324a, which is also sized to cooperate with the jaw members 476 to position the guide coupling assembly 142 in the underwater pipeline 18, in a manner similar to that described before.

It is apparent from the foregoing that the underwater connecting end 144a and the underwater connecting end 140a, shown in FIG. 7, each retain most of the advantages of the underwater connecting end 144 and the underwater connecting end 140, described before, and yet provide a single tapered surface which may be less costly to manufacture, in some instances.

Embodiment of FIGS. 8, 9 and 10

A preferred embodiment of the flange alignment assembly 146 is shown in detail in FIGS. 8, 9 and 10. As mentioned before, the salient purpose or function of the flange alignment assembly 146 is to properly align the bolt holes formed through a portion of the underwater connecting end 144 with the bolt holes formed through a portion of the underwater connecting end 140, so that a diver can more quickly, safely and efficiently secure the bolting interconnection between the constructed riser 12 and the underwater pipeline 18.

As mentioned before and shown in FIG. 8, the slip ring 338 has a plurality of bolt holes 500 formed therethrough and spaced circumferentially thereabout, and the flange 316 of the underwater connecting end 140 also has a plurality of bolt holes 502, shown in FIGS. 8 and 9, formed therethrough and spaced circumferentially thereabout.

In a preferred form, and as shown in FIGS. 8, 9 and 10, the flange alignment assembly 146 includes at least two pair of pin guide assemblies 504. Each pin guide assembly 504 includes a pair of removable guide members 506 which are generally triangularly shaped in one cross-section, as shown more clearly in FIG. 8, and arcuately shaped in another cross-section, as shown more clearly in FIG. 9.

Each guide member 506 has a base 508, an upper end 510 and guide sides 512 and 514, as shown more clearly in FIG. 8. In an assembled position of the pin guide assemblies 504, each base 508 is removably supported on the upwardly facing surface of the flange 316.

Each guide member 506 includes a pair of cylindrically shaped plugs 516, one end of each plug being secured to a portion of the base 508 of each guide member 506. The plugs 516 are secured and positioned on the base 508 of each guide member 506 such that, in the assembled position thereof, as shown in FIGS. 8, 9 and 10, each plug 516 is partially disposed through one of the bolt holes 502 in the flange 316. In the assembled position, each guide member 506 is positioned on the flange 316 so that one of the bolt holes 502 through the flange 316 is positioned generally between each pair of guide members 506, for reasons which will be made apparent below.

In the assembled position of each pin guide assembly 504, described above, the side 512 of one of the guide members 506 and the side 514 of the other guide member 506 of each pin guide assembly 504 cooperate to provide a generally funnel shaped guide path 518 therebetween. As shown more clearly in FIG. 8, the guide path 518 is wider generally adjacent the upper ends 510 of the guide members 506 with respect to the width of the guide path 518 generally near the bases 508 of the guide members 506. In other words, the guide path 518 generally funnels toward one of the bolt holes 502 formed in the flange 316, as shown more clearly in FIG. 9, for reasons which will be made more apparent below.

The flange alignment assembly 146 also includes one pin 520 to cooperate with each pin guide assembly 504. As shown more clearly in FIGS. 8 and 10, each pin 520 has an upper end 522 and a lower end 524, and each pin 520 is removably disposed through one bolt hole 500 in the slip ring 338 to a position wherein a portion of each pin 520 generally near the upper end 522 thereof is disposed above the upwardly facing surface of the slip ring 338.

A C-shaped clamp 526 is connected to each pin 520, generally near the upper end 522 thereof, as shown more clearly in FIG. 14. Each C-shaped clamp 526 is more particularly, pivotally secured to each pin 520 by a pivot pin 528, such that the C-shaped clamp 526 can be pivoted to a locking position wherein each C-shaped clamp 526 engages a portion of the slip ring 338 to secure the pin 520 connected thereto in an assembled position, as shown in FIGS. 8 and 10. Each C-shaped clamp 526 is also pivotable to a detached position, as shown in dashed-lines in FIG. 10.

Operation of FIGS. 8, 9 and 10

As mentioned before, the flange alignment assembly 146 is particularly constructed to align the bolt holes of the underwater connecting end 144 with the bolt holes of the underwater connecting end 140 as the constructed riser 12 is lowered into mating and interconnecting engagement with the underwater pipeline 18.

In one form, the pin guide assemblies 504 and, more particularly, each guide member 506 thereof can be positioned in an assembled position on the flange 316 prior to the lowering of the underwater pipeline 18 into the water. Each pin 520 can also be secured through one of the bolt holes 500 of the slip ring 338 prior to the lowering of the constructed riser 12 into the water.

In a preferred form, however, each pin guide assembly 504 and, more particularly, each guide member 506 is disposed on the flange 316 and each pin 520 is disposed through one of the bolt holes 500 by the diver immediately subsequent to the lowering of the constructed riser 12 into mating and interconnecting engagement with the underwater pipeline 18. Since each guide member 506 is removably positioned on the flange 316 via the plugs 516, the pin guide assemblies 504 can be easily, quickly and efficiently placed in an assembled position by the diver. After each pin 520 is inserted through one of the bolt holes 500 to an assembled position, the C-shaped clamp 526 associated therewith is moved to a locking position, shown in FIGS. 8 and 10, thereby securely positioning each pin 520 in an assembled position.

As the constructed riser 12 is lowered generally toward the underwater pipeline 18, the pin 520 and, more particularly, the cone-shaped end 524 thereof will be disposed generally within the guide path 518 formed by the surfaces 512 and 514 of the two guide members 506 of each pin guide assembly 504. Each guide side 512 and 514 will alternately and guidingly engage a portion of the pin 520 generally adjacent the lower end 524 thereof to guide the pin 520 into the particular bolt hole disposed between the two guide members 506 of each pin guide assembly 504.

As each pin 520 is guidingly engaged by the sides 512 and 514 of the two guide members 506, the slip ring 338 will be slidingly rotated on the upper surface 329 of the flange 328 on the underwater connecting end 144. The lower end 524 of the pin 520 will ultimately then be guided into the bolt hole 502 disposed between the two guide members 506, thereby assuring an alignment between the bolt holes 500 of the slip ring 338 and the bolt holes 502 through the flange 316.

After the constructed riser 12 has been lowered a sufficient distance such that a portion of each pin 520 generally adjacent the cone-shaped end 524 thereof has been disposed through the bolt hole 502 between the guide members 506, the constructed riser 12 will be held stationary while the diver removes the guide members 506 from their assembled position on the flange 316. The constructed riser 12 will then be lowered into a mating and interconnecting relationship with respect to the underwater pipeline 18.

After the constructed riser 12 has been matingly and interconnectingly positioned in the underwater pipeline 18, the diver will then pivot each C-shaped clamp 526 to a detached position (dashed-lines in FIG. 10), and remove each pin 520. The diver can then effect the bolting interconnection between the underwater connecting end 144 and the underwater connecting end 140.

It will be apparent to those skilled in the art that the flange alignment assembly, shown in FIGS. 8, 9 and 10, and described in detail above, cooperates with the underwater connecting end 144 and the underwater connecting end 140 so that the underwater interconnection therebetween can be effected in a quicker, easier, more efficient and safer manner.

It will be apparent from the foregoing, to those skilled in the art, that the riser section apparatus described in detail above provides a safer and more efficient means for constructing an underwater riser and connecting the constructed riser to an underwater pipeline. The apparatus is also constructed such that the various interconnections, that is the interconnection between the various riser sections 14 and the interconnection between the constructed riser 12 and the underwater pipeline are effected in a safer and more efficient manner, and in a manner substantially assuring a sealingly secure interconnection.

Changes may be made in the construction and the arrangement of the parts or the elements of the various embodiments described herein without departing from the spirit and the scope of the invention as defined in the following claims.

What is claimed is:

1. A riser section constructed to be interconnected to other riser sections to form a riser, each riser section being supportable in one position via a riser support assembly as another riser section is positioned in an interconnecting position therewith and secured thereto, the connected riser sections being subsequently lowerable into an interconnecting position with an underwater pipeline, each riser section comprising:

a pipe section, having a connecting upper end and a connecting lower end, the connecting upper end of the pipe section being connectable with the connecting lower end of another pipe section for interconnection of the pipe section to another pipe section; and a support ring secured about a portion of the outer periphery of the pipe section spaced a distance from the upper end thereof and extending generally radially therefrom forming an upper surface and a lower surface, the support ring positioned on the pipe section and sized to be engageable with a portion of the riser support assembly for securedly supporting the pipe section, and the connecting upper end of the supported pipe section being connectable to the connecting lower end of another pipe section in the supported position of the pipe section and in a connected position of the pipe section to another pipe section, the support ring being spaced from the connected portions of the pipe section and the other pipe section connected thereto.

2. The riser section of claim 1 wherein the support ring includes a plurality of apertures formed therethrough for facilitating the supporting and the lowering of the riser section.

3. The apparatus of claim 1 wherein the connecting upper end of the pipe section is defined further to include an uppermost end and a groove formed in the inner periphery of the pipe section intersecting a portion of the uppermost end thereof and extending a distance axially along the inner periphery thereof terminating with a beveled end, the beveled end of the groove forming an annular beveled surface in the connecting upper end of the pipe section; and wherein the connecting lower end of the pipe section is defined further to include a lowermost end and a groove formed in the outer periphery of the pipe section intersecting a portion of the lowermost end thereof extending a distance axially along the outer periphery thereof terminating with an annular end surface formed about the outer periphery of the connecting lower end of the pipe section, the annular end surface formed about the connecting lower end of the pipe section being engageable with a portion of the uppermost end of the connecting lower end of one other pipe section in an interconnecting position of two pipe sections, the lowermost end of the connecting lower end of the pipe section being engageable with a portion of the annular beveled surface formed in the connecting lower end of one other pipe section in an interconnecting position of two pipe sections.

4. The apparatus of claim 3 wherein the support ring formed about the pipe section is defined further as being formed on the outer periphery of the connecting upper end portion of the pipe section generally near the uppermost end thereof.

5. The apparatus of claim 3 wherein the lowermost end of the connecting lower end of the pipe section is beveled providing an annular beveled surface extending about a portion of the outer periphery of the lowermost end of the connecting lower end, the annular beveled surface of the connecting lower end being matingly connectable and engageable with the annular beveled surface formed about the inner periphery of the connecting upper end of one other pipe section in an interconnecting position of two pipe sections.

6. The apparatus of claim 3 wherein the lowermost end of the connecting lower end of the pipe section is beveled providing an annular beveled surface extending about a portion of the outer periphery of the lowermost end of the connecting lower end, the annular beveled surface of the connecting lower end and the annular beveled surface of the connecting upper end forming an annular V-shaped groove in an interconnecting position of two pipe sections to facilitate the welding interconnection therebetween.

7. Apparatus for connecting a riser and an underwater pipeline, one end of the riser connected to the underwater pipeline in an interconnected position of the riser and the underwater pipeline, the apparatus comprising:

a riser underwater connecting end, having an upper end and a lower end, the upper end thereof connected to one end of the riser, a radially outwardly tapering groove formed in the outer periphery of the riser underwater connecting end intersecting a portion of the lower end thereof, thereby forming an annular tapered surface extending about the outer periphery of the riser underwater connecting end, an annular flange formed on the outer periphery of the riser underwater connecting end extending generally radially therefrom and forming an annular downwardly facing surface and an annular upwardly facing surface;

a pipeline underwater connecting end having an upper end and a lower end, the lower end thereof connected to one end of the underwater pipeline, a radially inwardly tapering groove formed in the inner periphery thereof intersecting a portion of the upper end thereof forming an annular tapered surface extendin about a portion of the inner periphery of the pipeline underwater connecting end, the annular tapered surface of the pipeline underwater connecting end guidingly and matingly engageable with the annular tapered surface of the riser underwater connecting end in an interconnected position of the riser and the underwater pipeline, an annular flange formed on the outer periphery of the pipeline underwater connecting end extending generally radially therefrom and a plurality of bolt holes formed through the flange of the pipeline underwater connecting end spaced circumferentially about the flange, a portion of the annular flange of the pipeline underwater connecting end being engageable with a portion of the annular downwardly facing surface formed via the annular flange on the riser underwater connecting end in an interconnected position of the underwater pipeline and the riser;

an annular slip ring disposed about the riser underwater connecting end, a portion of the annular slip ring slidingly engageable with the upwardly facing surface formed by the flange about the outer periphery of the riser underwater connecting end, a plurality of bolt holes being formed through a portion of the slip ring and spaced circumferentially thereabout alignable with the bolt holes formed in the flange formed on the pipeline underwater connecting end in one position of the slip ring for bolting interconnection between the riser and the underwater pipeline;

a pin having an upper and lower end, the pin disposed through one of the bolt holes in the slip ring and one of the bolt holes of the flange of the riser underwater connecting end in one position;

clamp means connected to the pin generally adjacent the upper end thereof, the clamp means engaging a portion of the slip ring in one position of the clamp means to secure the pin in an assembled position, a portion of the pin extendable through one of the bolt holes in the slip ring and a portion of the pin generally adjacent the lower end thereof extendable a distance downwardly from the slip ring in an assembled position of the pin; and guide means removably supportable on a portion of the flange formed on the pipeline underwater connecting end having a portion extendable a distance generally upwardly therefrom and another portion forming guide sides defining a guide path, the guide sides being engageable by a portion of the pin generally adjacent the lower end of the pin in one position of the pin for guiding a portion of the pin through one of the bolt holes of the flange formed on the pipeline underwater connecting end.

8. The apparatus of claim 7 wherein the guide means is defined further to include: a pair of guide members, each guide member removably supportable on a portion of the flange formed on the pipeline underwater connecting end and extendable a distance generally upwardly therefrom, each guide member having a guide side, the guide sides of the two guide members defining the guide path in an assembled position of the guide members, each guide side being engageable by a portion of the pin generally adjacent the lower end of the pin in one position of the pin for guiding a portion of the pin through one of the bolt holes of the flange formed on the pipeline underwater connecting end.

* * * * *

PO-1050
(5/69)

UNITED STATES PATENT OFFICE
CERTIFICATE OF CORRECTION

Patent No. 3,848,421      Dated November 19, 1974

Inventor(s) Billy L. O'Brien and Heber P. O'Brien

It is certified that error appears in the above-identified patent and that said Letters Patent are hereby corrected as shown below:

Column 3, line 65, "showng" should be --showing--.

Column 6, line 43, "dispoed" should be --disposed--.

Column 6, line 65, "cran" should be --crane--.

Column 12, line 39, "maring" should be --marine--.

Column 17, line 18, "IN" should be --In--.

Column 18, line 12, "and" should be --end--.

Column 24, line 25, "extendin" should be --extending--.

Signed and sealed this 4th day of February 1975.

(SEAL)
Attest:

McCOY M. GIBSON JR.
Attesting Officer

C. MARSHALL DANN
Commissioner of Patents